(12) United States Patent
Morand et al.

(10) Patent No.: US 6,538,566 B1
(45) Date of Patent: Mar. 25, 2003

(54) MONITORING A TIRE BY ACCELERATION MEASUREMENT

(75) Inventors: Jean-François Morand, Paris (FR); Jacques Sirven, Versailles (FR)

(73) Assignee: Thomson CSF Detexis, Saint Cloud (FR)

( * ) Notice: Subject to any disclaimer, the term of this patent is extended or adjusted under 35 U.S.C. 154(b) by 0 days.

(21) Appl. No.: 09/445,055

(22) PCT Filed: May 20, 1998

(86) PCT No.: PCT/FR98/01014
§ 371 (c)(1),
(2), (4) Date: Dec. 1, 1999

(87) PCT Pub. No.: WO98/56606
PCT Pub. Date: Dec. 17, 1998

(30) Foreign Application Priority Data

Jun. 10, 1997 (FR) .............................. 97 07180

(51) Int. Cl.[7] .............................................. B60C 23/00
(52) U.S. Cl. ..................... 340/444; 73/146.2; 340/442; 340/443
(58) Field of Search ................................ 340/442, 447, 340/443, 444, 448; 73/146.2; 180/274; 280/735

(56) References Cited

U.S. PATENT DOCUMENTS

| 4,300,119 | A | * | 11/1981 | Wiernicki | .................. | 340/447 |
| 4,567,460 | A | * | 1/1986 | Gebler | ...................... | 340/442 |
| 4,578,992 | A | | 4/1986 | Galasko et al. | ............ | 73/146.5 |
| 5,471,390 | A | * | 11/1995 | Sasaki | ........................ | 701/78 |
| 5,546,070 | A | | 8/1996 | Ellmann et al. | ............ | 340/442 |
| 5,658,011 | A | * | 8/1997 | Byon | .......................... | 280/735 |
| 5,717,376 | A | * | 2/1998 | Wilson | ........................ | 340/442 |
| 5,825,286 | A | * | 10/1998 | Coulthard | .................... | 340/447 |
| 5,866,812 | A | * | 2/1999 | Nishihara et al. | .......... | 73/146.2 |
| 5,900,808 | A | * | 5/1999 | Lebo | .......................... | 340/442 |

FOREIGN PATENT DOCUMENTS

| EP | 0 197 813 | 10/1986 |
| EP | 0 563 713 | 10/1993 |
| EP | 0 641 679 | 3/1995 |
| GB | 2 307 044 | 5/1997 |
| WO | WO 93/25400 | 12/1993 |

OTHER PUBLICATIONS

Piezoelectric Powered (Batteryless) Radio Frequency Identification Tag for Tires, IBM Technical Disclosure Bulletin, vol. 39, No. 8, Aug., 1996, pp. 245–246.

* cited by examiner

*Primary Examiner*—Brent A. Swarthout
(74) *Attorney, Agent, or Firm*—Christie, Parker & Hale, LLP

(57) ABSTRACT

The invention relates to the in-service monitoring of the condition of a tire of a wheel of a vehicle. To this end it proposes a process and, in particular, a device comprising: a sensor (4) mounted on the wheel, coupling means (BVF2, BRF2) for transmitting to the vehicle indications derived from this sensor (4), and electrical energizing means (BVF1, BRF1). According to the invention, the sensor (4) is a miniature acceleration-sensitive sensor implanted in the tread of the tire or in the vicinity of the tread. The coupling means, mounted on the wheel, then transmit indications relating to the measurements made at the moment at which the tread is in contact with the ground.

8 Claims, 5 Drawing Sheets

MONITORING A TIRE BY ACCELERATION MEASUREMENT

BACKGROUND OF THE INVENTION

The invention relates to the in-service monitoring of the condition of a tire of a wheel of a vehicle.

It deals with a fundamental requirement: the damage which may result for example from the under-inflation of a tire and the seriousness of the litigation which may result therefrom are known.

Very numerous solutions have been proposed, usually hinged around pressure sensors, frequently incorporated into the valve of the tire, and in any event accessible from the rim side. The applicable constraints are fairly draconian, since it is in particular necessary to maintain wheel balance. Now, to be specific, pressure sensors are generally fairly voluminous and heavy especially if they contain the energy source. Moreover, the measurement of (relative) pressure requires a reference which is, in general, the atmospheric pressure which is dependent on altitude and remains very sensitive to other parameters, including temperature.

None of the present-day solutions is truly general. Specifically, the problem posed, which is already complex, is accompanied by the need to transmit the information from the wheel to the vehicle, having regard to a relative rotation varying from zero speed to very high speeds. All of this leads to a prohibitive cost, apart from a few exceptions, such as the case of heavy goods vehicles.

The present invention aims to improve the situation.

SUMMARY OF THE PRESENT INVENTION

To do this, there is proposed a process for the in-service monitoring of the condition of a tire of a wheel, characterized by the steps consisting in:

providing in the tire, near the tread, a miniature sensor, sensitive to the acceleration, and monitoring the variations in the measurement from this sensor, the measurements made in the zone where the tread is in contact with the ground being related to the size of this zone and, thereby, to the condition of the tire.

The invention also concerns a device for the in-service monitoring of the condition of a tire of a wheel of a vehicle, of the type comprising a sensor mounted on the wheel, coupling means for transmitting to the vehicle indications derived from this sensor, and electrical energizing means. According to the invention, the sensor is a miniature sensor sensitive to the acceleration, implanted in the tread of the tire or in the vicinity of the tread, and the coupling means, mounted on the wheel, transmit indications relating to the measurements made at the moment at which the tread is in contact with the ground.

The invention also covers the tire equipped accordingly.

BRIEF DESCRIPTION OF THE DRAWINGS

Other characteristics and advantages of the invention will become apparent on examining the detailed description hereinbelow, and the appended drawings in which.

The appended drawings are, for the most part, of a definite nature, dealing in particular with forms. Accordingly, they will not only be able to serve to make the description more understandable, but also contribute to the definition of the invention, as the case may be.

DETAILED DESCRIPTION OF THE PREFERRED EMBODIMENT

Figure 1:
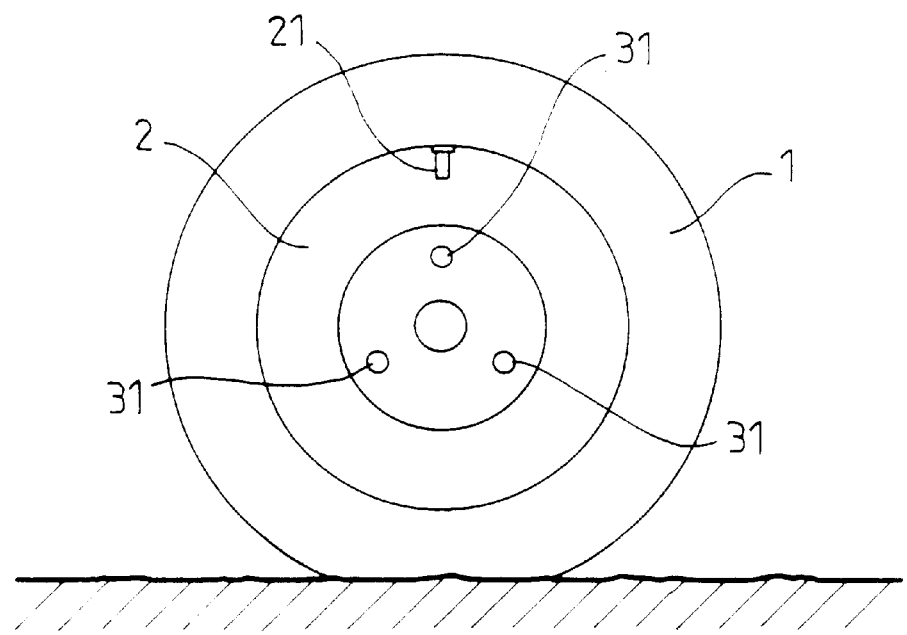
FIG. 1 diagrammatically illustrates a tire, mounted on a wheel, and under load.

In FIG. 1, a rim 2, furnished with fastening points 31 on the hub, supports a tire 1 (assumed here to have no inner tube), and its inflation valve (21).

Figure 2:
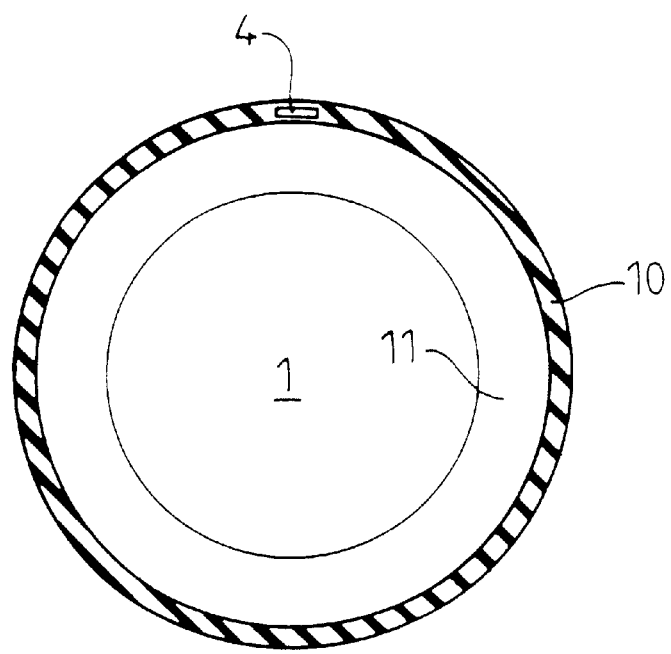
FIG. 2 illustrates the implanting of an accelerometer into the tire of FIG. 1.

FIG. 2 shows the tire, with one of the sidewalls 11, and its tread 10 seen in section. The latter houses an accelerometer 4, preferably placed in the tread of the tire or inside against the reinforcing ply.

Figure 3:
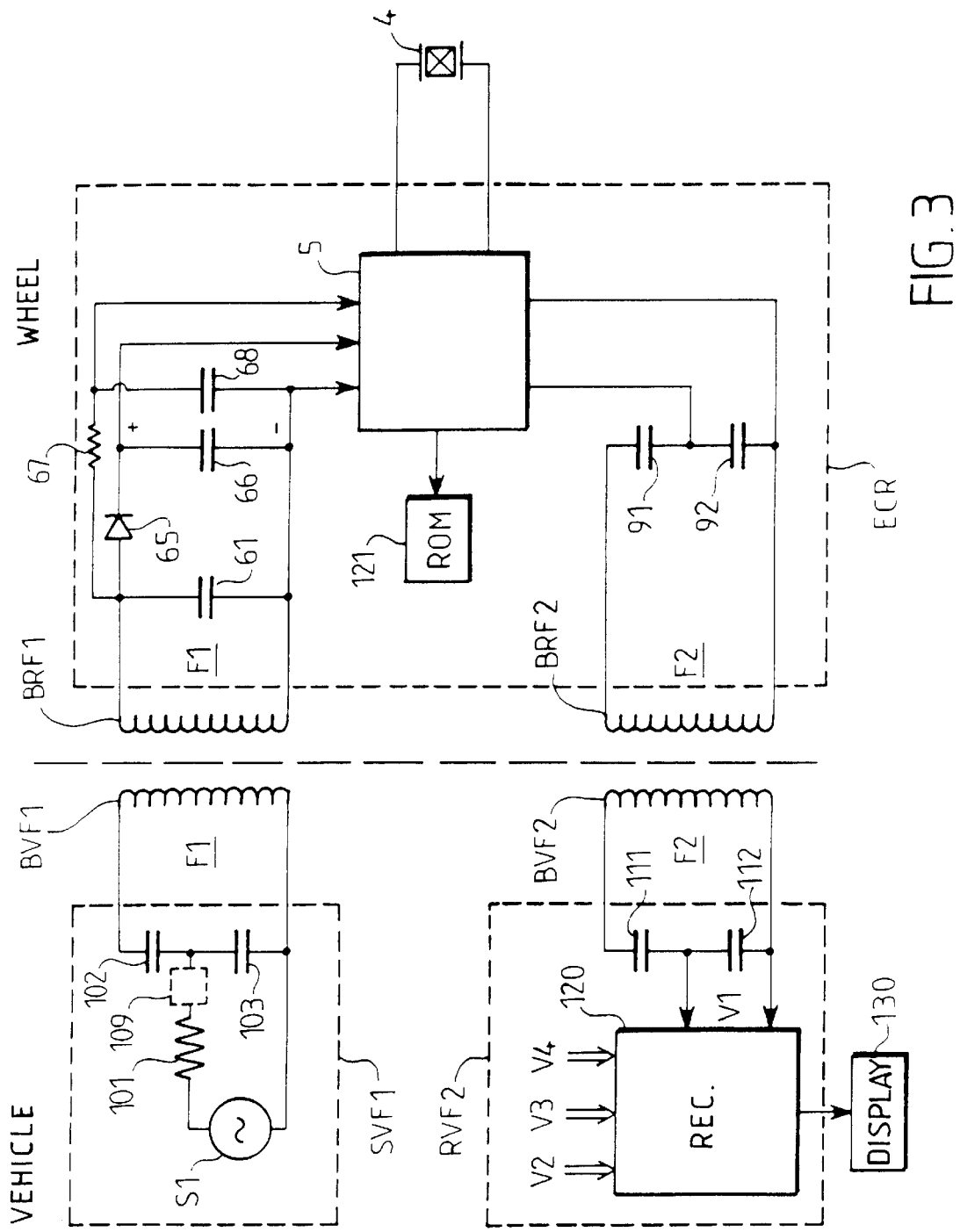
FIG. 3 illustrates electronic circuits relating to an embodiment of the invention.
Figure 4:
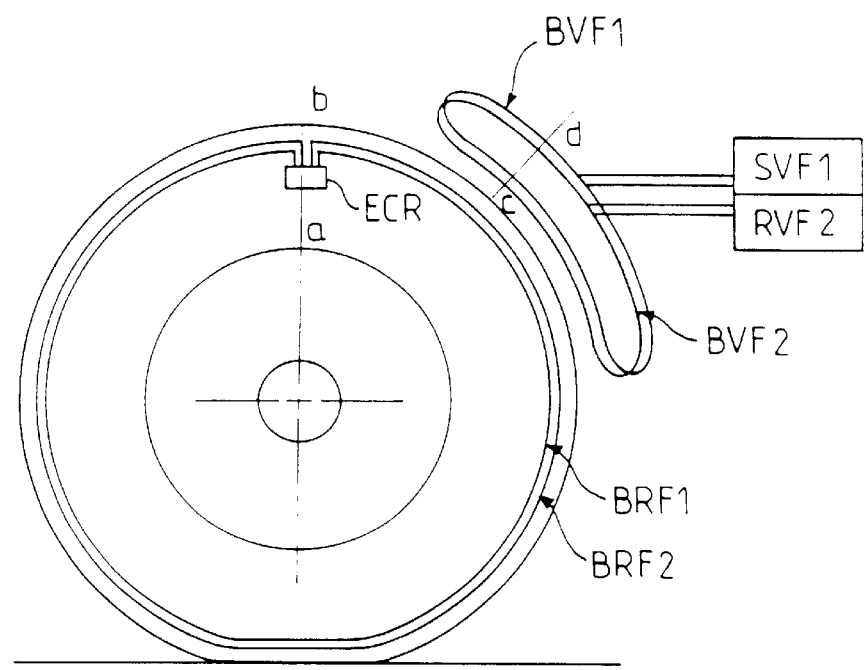
FIG. 4 illustrates the mode of exchanging information between the wheel and the vehicle, as well as the passage of the electrical supply.

The electronic assembly circuit of the currently preferred embodiment appears in FIG. 3, with details of implantation in FIG. 4. In FIG. 3, the part situated on the left of the line of long dashes is on the vehicle; that to the right is on the wheel, more precisely in the tire.

The accelerometer 4 is associated with an electronic microcircuit 5. The latter can be energized in various ways: battery, recovery of mechanical energy, in particular.

Here, preference is given to energization by electrical, magnetic or electromagnetic coupling with the vehicle. A loop (open) BRF1 is provided in the tire. The assembly circuit ECR comprises a capacitor 61 for tuning this loop to the frequency F1, and a diode-based rectifier 65 and capacitor 66 for storing the energy and filtering the voltage. The voltage obtained energizes the circuit 5 for processing the measurements from the sensor 4.

On the vehicle side, an alternating voltage source S1 alternating at the frequency F1, of internal resistance 101, energizes a capacitive tuning divider 102–103, then a loop BVF1 which is mounted (FIG. 4) so as to be coupled with the loop BRF1 over a part of the periphery of the tire. The size of the loop BVF1 can correspond to around 1/10 of the development of the tire. The illustration of the loop BRF1 is here separated from the part of the periphery of the tire, so that it can be distinguished from the loop BRF2, which will be dealt with later.

Figure 12:
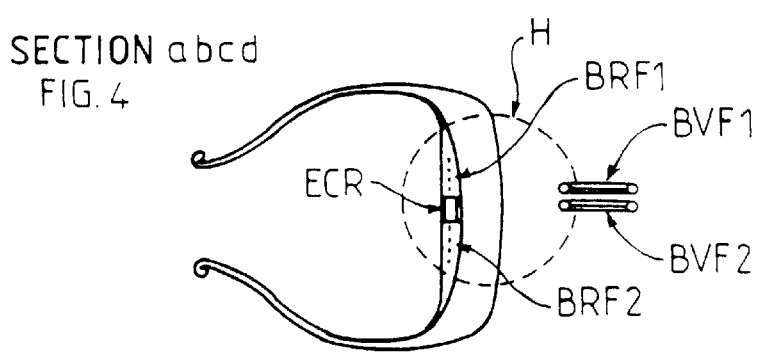
FIG. 12 illustrates the relative installations of the loops and their coupling.

FIG. 12 provides a better understanding of the relative position within the tire of the loops BRF1 and BRF2 associated with the circuit ECR, in one embodiment.

The loop BRF1 thus constructed allows permanent coupling of the supply provided by the loop BVF1.

Such an emission of the order of a watt makes it possible to obtain at least a few milliwatts of DC supply for the circuit ECR, regardless of the relative positions of the wheel and the vehicle (suspension and steering, in particular).

The transfer of the measurements will now be described. The output from the processing circuit 5 is a voltage of modulated frequency F2 applied through a capacitive tuning divider 91–92 to a loop BRF2 of the tire. On the vehicle side, a loop BVF2 is furnished with two tuning capacitors 111–112. The latter deliver an asymmetric output, applied to a reception and processing circuit 120. In addition to the channel V1 originating from the tire under consideration, this circuit 120 can receive three other channels V2, V3 and V4 coming from the other tires. Emission from the channels V1, V2, V3 and V4 towards the reception circuit 120 can be effected separately or in parallel. A display member 130 is associated therewith, or better still the transfer of information is effected by way of the on-board computer connected to an integrated display.

Likewise, by symmetry, the coupling of the loop BRF2 with the loop BVF2 is permanent.

An emission by the loop BRF2 of the order of 1 milliwatt makes it possible to obtain a few microwatts as output from the loop BVF2 associated with the vehicle. This level is amply sufficient to process the information, whilst remaining sufficiently low as not to disturb the electromagnetic environment.

The frequency F1 is for example between 10 and 200 kHz, preferably towards 50 kHz. The frequency F2 is chosen to be markedly different so as to avoid mutual coupling of the loops BRF1 with BRF2, and BVF1 with BVF2; F2 is preferably higher, towards 80 kHz for example.

Figure 11:
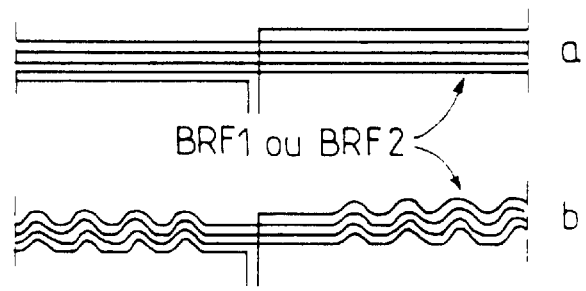
FIGS. 11(a and b) illustrate embodiments of coupling loops included in the tire.

The loops BRF1 or BRF2 included in the tire are coiled in such a way as to allow longitudinal elasticity for easy installation. Rather than a conventional coiling process (FIG. 11a), an undulation is created, as shown in FIG. 11b for example. Furthermore, to ensure the mechanical fastness of the loops over the lifetime of the tire, it is advantageous to use divided wire to construct the said loops.

The coils can be incorporated into the tire in its tread, above its armoring (radially toward the outside), the armoring being metallic or otherwise. However, this necessitates that provision be made for the connections to these coils during the manufacture of the tire. A beneficial variant (FIG. 12) consists in placing the coils on the mold serving in the manufacture of the tire, which is then implanted around the coils; better mechanical fastness (elastic behavior under stresses) of the coils can then be obtained, and their connections can be soldered beforehand, the assembly of the coils and ECR circuit forming a modular subassembly.

The Applicant has also observed that at the frequencies under consideration it is advantageous to use insulated wires, in particular so-called Litz wires (known in the coils of amplitude-modulation, long and/or medium wave radio sets).

The general principle of these loops is known, and described in particular in EP-A-551470. These latter loops could moreover be used as they are, so long as provision is made for a lead between the tire and the said loops. In general, and regardless of its use, recourse to leads (electrical couplings) is not excluded from the present invention. Neither is recourse to couplings by essentially magnetic effects excluded.

Figure 5:
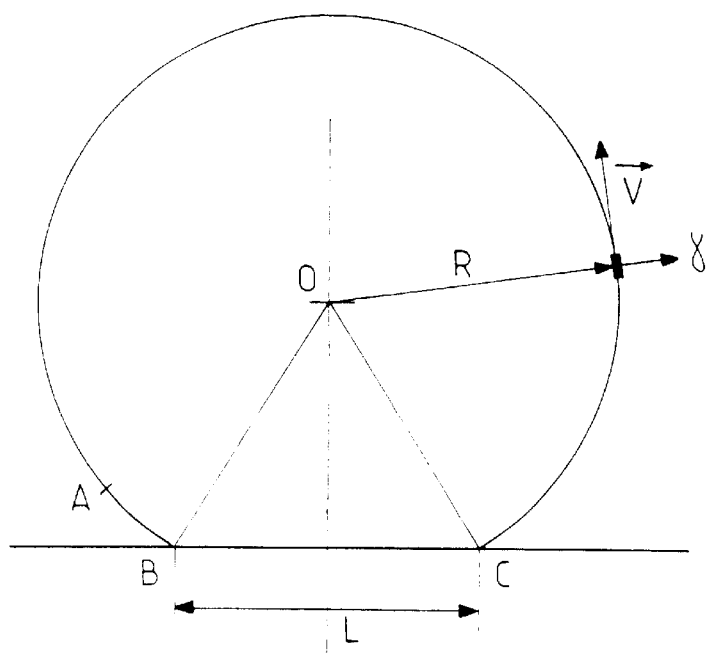
FIG. 5 illustrates the shape of a tire under load.

In FIG. 5, a tire of radius R is given a peripheral speed V. Under load, a zone BC of this tire, of length L, is in contact with the ground.

At the point A, the centrifugal radial acceleration is $V^2/R$. The Applicant has observed that between the points B and C, on the other hand, the centrifugal radial acceleration is substantially zero, the differential speed of the tire with respect to the ground being substantially zero (except in the case of skidding, which is not normal operation).

By implanting a miniature accelerometer into the tire, it is then possible to detect the zone BC. The passing of the radial—or centrifugal, normal to the ground—acceleration to a substantially zero value allows temporal identification of the zone BC overall. (The points B and C could also be detected by investigating discontinuities in the tangential acceleration, in the plane of the ground. It would be conceivable to use this effect at least in part.)

Figure 6:
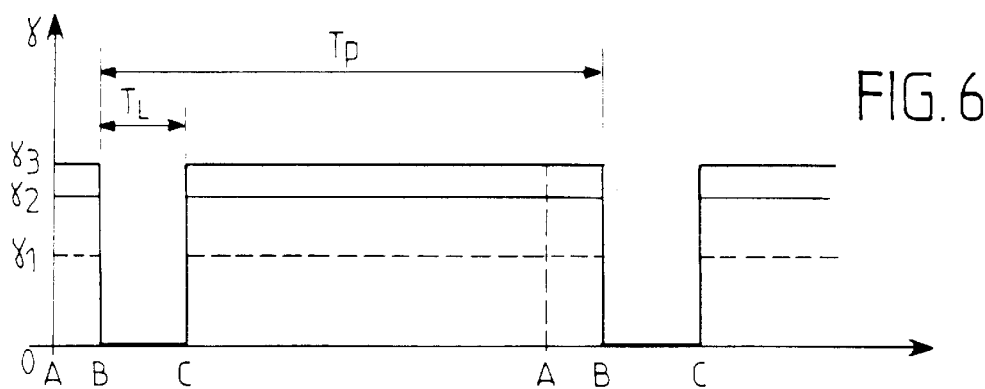
FIG. 6 illustrates diagrammatically the general profile of the acceleration.

It is currently preferred to process only the radial acceleration, the profile of which is given in FIG. 6. For various speeds V1, V2 and V3, accelerations $Y_1$, $Y_2$ and $Y_3$ are obtained. The acceleration is almost zero during the time interval TL which corresponds to the journey of the accelerometer between the points B and C. It is high for the remainder of the time, as soon as the vehicle attains a speed of a few kilometers/hour. The period Tp of rotation of the tire is also given by the measurements.

The speed of the vehicle is easily deduced from this, the diameter of the wheel being known (usually to better than 1%).

The length L is dependent:

a) on the part of the mass M of the vehicle, or wheel load, which is borne by the relevant wheel, b) on the pressure (differential, not absolute) of the tire, itself dependent on temperature and on variation in atmospheric pressure due mainly to altitude, c) on the tangential speed V, insofar as the centrifugal force is not compensated for in the ground-bearing zone BC (this results in a phenomenon of the upward shifting of the tire with respect to the rim, which can be observed in high-speed pictures).

Factors a) and c) can be determined through a calculation which is easily accessible onboard the vehicle. The pressure is therefore derived therefrom. It should be remarked that the law connecting the length L to the speed V and to the wheel load can be tabulated for the relevant vehicle, as a function of ambient temperature. At low speeds, the effect of the wheel load is predominant; it is therefore possible to refine the consideration of this wheel load, if necessary, or to differentially compare the pairs of Front and Rear wheels, with one another and pairwise.

It is then sufficient to measure and transmit the durations TL and Tp from the tire to the vehicle. This can be done by analog or digital modulation of the carrier F2 by the acceleration signals.

It is easy to append a temperature-sensitive circuit, for example a diode, to the circuit 5. The temperature information is then available and can be transmitted together with the acceleration information.

Various types of analog modulations may be suitable. The simplest is amplitude modulation by the signal of FIG. 6: there is emission during the periods TL. Much more advanced modulations can be envisaged. If appropriate, the temperature is transmitted by frequency or phase modulation of the carrier F2.

In digital, it is possible to measure the times TL and Tp in the circuit 5, to construct the mean thereof with an appropriate time constant, and to transmit these mean measurements to the vehicle. The circuit 5 has a clock for creating the frequency F2 whose stability is compatible with the tuning band of the loops. Furthermore, the frequency F1 of the supply can be used to stabilize or lock this clock. It has been observed experimentally that a variation occurs in the tuning band of the loops, but this variation remains sufficiently limited as not to impede operation. This clock F2 serves, after division, to count the durations TL and Tp. Also, the mean is constructed by simply accumulating a predetermined number of measurements or a number chosen as a function of the quality of the measurements, for example. The carrier transmits the measurement clock. As appropriate, the temperature is transmitted as another data item.

Whether it be analog or digital, this circuit 5 is therefore very simple and can have a low electrical consumption.

Figure 7A:
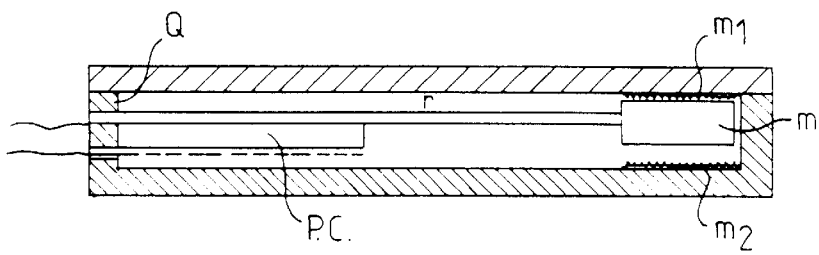
FIGS. 7(a and b) diagrammatically illustrate a first form of accelerometer applicable to the invention.
Figure 7B:
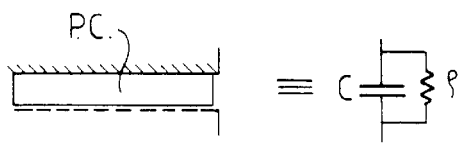
Figure 8:
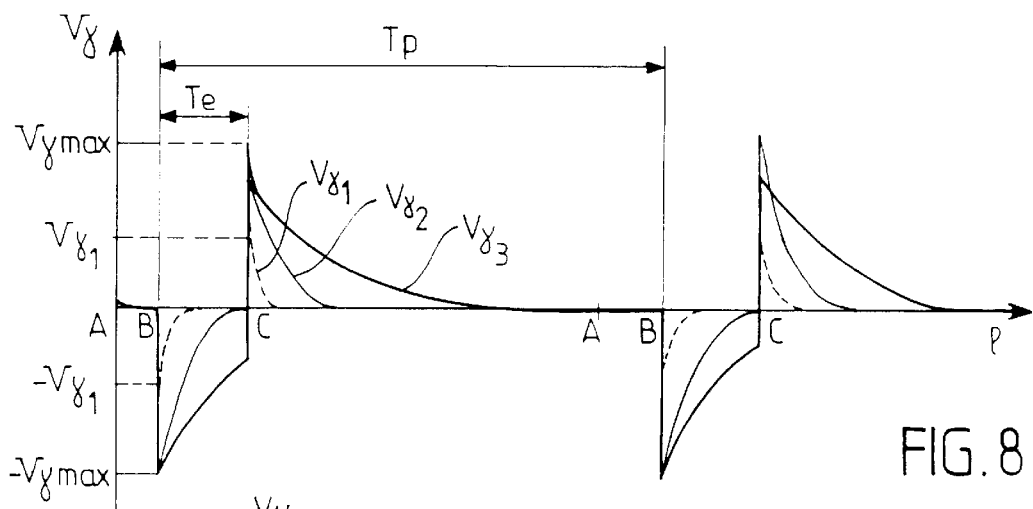
FIG. 8 illustrates the voltage across the terminals of the piezoelectric sensor of FIGS. 7 for various speeds of rotation as a function of the wheel angle.
Figure 9:
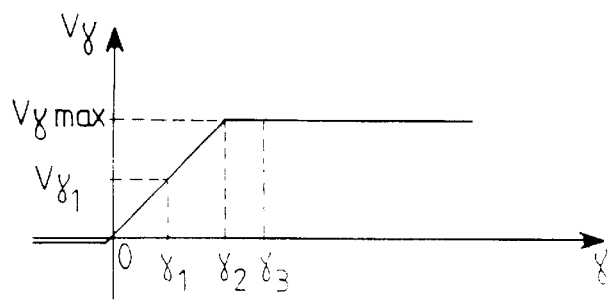
FIG. 9 illustrates the relationship between the true acceleration and the peak voltage measured on account of the acceleration limiter of FIG. 7.

The principle of a usable accelerometer is illustrated in FIG. 7A. A mass m is secured to a sprung strip r built in at Q. A piezoelectric sensor PC is fastened to the lower part of the sprung strip; the latter, by deforming under the effect of the centrifugal force concentrated mainly in the mass m, compresses the component PC which delivers the measurement, in the form of a voltage (without itself having to be energized). This voltage varies as a function of time and depends on the speed, as well as on the time constant of the circuit $\rho C$ (capacitance C shunted by a leakage resistance $\rho$, as illustrated in FIG. 7b).

It will be noted that the high accelerations are of no benefit. A clipping is therefore carried out between the two stops $m_1$ and $m_2$. This in fact involves an accelerometer with a threshold close to zero, capable of indicating, in all or nothing mode, whether or not the acceleration is near-zero. Suitable damping is provided so as to avoid the noise produced by the knocking of the mass m on the faces of the box which limit the stroke and hence clips the acceleration effect.

Figure 10:
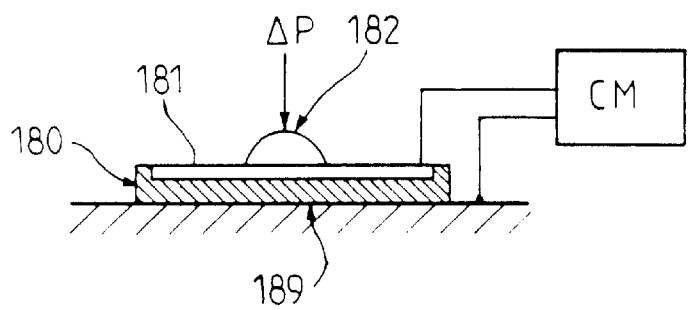
FIG. 10 diagrammatically illustrates a second form of accelerometer applicable to the invention.

A variant is illustrated in FIG. 10. A box 180 forms an "aneroid" chamber with, in the upper part, a metallized membrane 181 furnished with a mass 182. The interior of the box is evacuated (under low vacuum), as in a mechanical barometer. A measurement of capacitance CM is performed between the mass 182, lower plane of the box, and the membrane 181. For this measurement of capacitance, use is made of the source of frequency F2 and, for example, of a standard capacitance. When at rest, the measurement indicates the pressure of the tire, to the reduced accuracy which is sufficient to indicate whether or not the tire is in the rolling condition; when moving, during the passage of the zone BC, the measurement varies abruptly, this serving as before. It is also possible to clip the value of the acceleration by limiting as previously the travel of the mass 182.

In this second embodiment, a combined pressure and acceleration sensor is therefore obtained. Naturally, separate sensors can be used.

Moreover, instead of the capacitive measurement of the displacements of the membrane 181, it is possible to provide other techniques, for example four strain gauges mounted bridgelike on the membrane.

Regardless of its mechanical embodiment, the sensor will exhibit a natural frequency (resonance). As regards the tire, it is also the root of periodic (short term) phenomena, including the periodicity of rotation of the wheel, which corresponds to frequencies ranging from 0 to some 100 Hertz (50 wheel revolutions per second give of the order of 100 meters per second, i.e. 360 km/hour). The natural frequency of the sensor will be chosen to be outside this band, and/or it will be used in order to improve the quality of the response as a function of the period of rotation of the wheel, and hence of the speed of the vehicle.

The Applicant has observed that the transmission by the loops BRF1 and BVF1 (and/or BRF2 and BVF2) may easily be rendered bidirectional. It is then beneficial to append a nonvolatile memory 121, of epROM or eepROM type to the circuit in the tire. By temporarily increasing, if need be, the energizing power, the circuit 5 will be able to write into this memory information which returns to it from the unit 120, for example:

number of wheel revolutions over a time T, which corresponds to the number of kilometers made by the tire over the time T, number of wheel revolutions or of kilometers made while under-inflated, maximum speed encountered, possibly insofar as it exceeds the specifications stipulated for the tire, duration of a pressure drop, so as to verify whether the tire has not been used outside its specifications, duration of an overload.

These quantities can be recorded as point values and/or as an aggregate. The calculations required can be conducted in the computer on board the vehicle, or else, the processing (calculating) power required being low, in the processor housed in the tire. In the latter case, the vehicle indicates simply to the tire the moment at which it must carry out these operations (synchronization), providing it with the extra energy required, if necessary.

If the calculations are carried out on board the vehicle, it is for example possible (FIG. 3) to provide a modulator 109 downstream of the resistor 101 and, on the reception side, a serial resistance link 67, and parallel capacitor 68 toward the earth, leaving from one of the terminals of the coil BRF1 and culminating at a (slow speed) data input of the unit 5.

A sort of "historical chart" is thus obtained, incorporated into the tire itself, possibly with an image copy on board the vehicle. Writing to this chart can be triggered automatically, advantageously when the vehicle is brought to rest (switching off the ignition for example), and/or when it is started up again. The updating of the historical chart is thus carried out on each use of the vehicle. An important advantage of writing to the tire is the following: the tire alone is sufficient in order to be able to track its own evolution, independently of the wheel and of the vehicle.

The switching of the circuit 5 in reception onto the loop BRF2 preferably occurs through the appearance of an overvoltage applied to the loop BVF1. This overvoltage is presently deemed to be very advantageous in order to have sufficient energy for proper writing to memory of the parameters transmitted from the vehicle to the relevant wheel. A circuit similar to that used on the vehicle for a wheel can serve as a test bench for reading the inscriptions placed in memory in the tire and ensuring management thereof.

Likewise, the interaction of the loops BRF2 and BVF2 can be used for purposes other than electrical supply. It is for example possible to superimpose a clock, a time reference or another useful signal on the supply.

In certain applications at least, it would be conceivable to use the same loops for the energy supply and the transmission of data, because the loops are bidirectional, and/or because the transmission of the data takes place under modulation by absorption of the energy supply (the power demand is greater or lesser depending on a binary signal to be transmitted). At another level, and in a very simple version, it would be possible to use an accelerometer with threshold which directly actuates an electrical contact (the latter possibly controlling the absorption of power, if this is combined with the previous variants).

What is claimed is:

1. A process for the in-service monitoring of the condition of a tire of a wheel riding on a ground, the tire having a tread, the process comprising the steps of:
   providing in the tire, near the tread, a miniature sensor for sensing radial acceleration;
   monitoring the variations in the measurement from the sensor;
   detecting a decrease in the radial acceleration, said decrease corresponding to a zone of the tread in contact with the ground; and
   measuring a period of low radial acceleration phases and a fraction of this period during which the radial acceleration is low, said fraction within each period being related to a length of said zone where the tread is in contact with the ground, and thereby to the condition of the tire.

2. A process according to one of claims 1, characterized in that when the tread is in contact with the ground such contact is registered via a sensible variation in the sensed radial acceleration.

3. A process according to one of claim 1, characterized in that the period at which the tread is in contact with the ground is also detected, this period being related to the speed of rotation of the wheel.

4. A process according to claim 1, characterized in that at least part of the measurements transmitted to the vehicle by electrical, magnetic or electro-magnetic coupling.

5. A process according to claim 1, characterized in that the sensor is energized by a battery also housed in the tire.

6. A process according to one of the claim 1, characterized in that the sensor is energized by electrical, magnetic or electro-magnetic coupling.

7. A process according to one of the claim 1, characterized in that a miniature pressure sensor is furthermore provided in the tire.

8. A process according to one of the claim 1, characterized in that a test bench is furthermore provided which is capable of reading inscriptions placed in memory in the tire after the latter is dismantled.

* * * * *